(12) United States Patent
Thompson et al.

(10) Patent No.: US 9,946,534 B1
(45) Date of Patent: Apr. 17, 2018

(54) TECHNIQUES FOR AUTOMATED DATABASE DEPLOYMENT

(71) Applicant: JPMorgan Chase Bank, N.A., New York, NY (US)

(72) Inventors: Keith Thompson, Clearwater, FL (US); Russell T Busch, Lithia, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 14/996,682

(22) Filed: Jan. 15, 2016

(51) Int. Cl.
*G06F 17/30* (2006.01)
*G06F 7/00* (2006.01)
*G06F 17/00* (2006.01)
*G06F 9/44* (2018.01)

(52) U.S. Cl.
CPC .......... *G06F 8/71* (2013.01); *G06F 17/30371* (2013.01)

(58) Field of Classification Search
CPC ......... G06F 17/30088; G06F 17/30174; G06F 2201/84; G06F 2009/45595; G06F 2009/45562; G06F 21/53; G06F 8/60; G06F 9/45558; G06F 17/3089; G06F 8/71; G06F 17/30371; Y10S 707/99942; Y10S 707/99943; Y10S 707/99933
See application file for complete search history.

(56) References Cited

U.S. PATENT DOCUMENTS

| | | | | |
|---|---|---|---|---|
| 8,484,638 B2 * | 7/2013 | Tal | ............................ | G06F 8/65 709/220 |
| 9,002,792 B2 * | 4/2015 | Pittelko | ............... | G06F 11/1448 707/616 |
| 9,152,501 B2 * | 10/2015 | Belluomini | ......... | G06F 11/1415 |
| 9,292,822 B2 * | 3/2016 | Hankins | ................. | G06Q 10/10 |
| 9,825,964 B2 * | 11/2017 | Mellor | ................. | H04L 63/102 |
| 2003/0086536 A1 * | 5/2003 | Salzberg | ................ | H04M 3/22 379/15.02 |
| 2008/0140636 A1 * | 6/2008 | Brodhun | ........... | G06F 17/30604 |
| 2009/0063580 A1 * | 3/2009 | Allen | ..................... | G06Q 10/06 |

(Continued)

OTHER PUBLICATIONS

Grust et al., True language-level SQL debugging, Mar. 2011, 4 pages.*

(Continued)

*Primary Examiner* — Thuy Dao
(74) *Attorney, Agent, or Firm* — Goodwin Procter LLP

(57) ABSTRACT

New techniques for automated database deployment are disclosed. Change SQL files intended for any target database are checked into a designated source code control repository. A pre-validation process is applied to the proposed changes and reports all errors therein, not just the first error found. A tracking mechanism may find and report changes that have been done against a database since the last deployment, including changes applied without following source control procedure. All recent SQL files since previous promotion can be automatically gathered and built into a master run book SQL for execution in a correct sequence. Backout SQL may also be automatically generated and validated. A pre-test or mock deployment may be performed during regular business hours against an automatically generated copy of the target database. With these techniques, deployments and maintenance of databases become more efficient, and failure rates and failover responses could be significantly improved.

17 Claims, 9 Drawing Sheets

(56) References Cited

U.S. PATENT DOCUMENTS

| | | | | |
|---|---|---|---|---|
| 2009/0307763 A1* | 12/2009 | Rawlins | ............ | G06F 9/44505 |
| | | | | 726/5 |
| 2012/0271857 A1* | 10/2012 | Chasman | ......... | G06F 17/30578 |
| | | | | 707/791 |
| 2014/0236921 A1* | 8/2014 | Belknap | ........... | G06F 17/30469 |
| | | | | 707/718 |
| 2016/0062870 A1* | 3/2016 | Menahem | ............. | G06F 11/362 |
| | | | | 717/125 |
| 2016/0092525 A1* | 3/2016 | Kothari | ............ | G06F 17/30563 |
| | | | | 707/602 |
| 2016/0110406 A1* | 4/2016 | Zircher | ............ | G06F 17/30371 |
| | | | | 707/690 |

OTHER PUBLICATIONS

Uzelac et al., Testing spatial methods in SQL Server 11.0, Jun. 2011, 6 pages.*
Letarte et al., Targeted genetic test SQL generation for the DB2 database, May 2012, 6 pages.*

* cited by examiner

FIG. 7

| Proposed_Changes (date) | Status (after execution) | Validated_Changes (number of files moved) | Version_Number |
|---|---|---|---|
| August 08, 2015 | Success | 5 | 3 |
| August 11, 2015 | Success | 8 | 4 |
| August 12, 2015 | Failed | 0 | 4 |
| August 13, 2015 | Success | 7 | 5 |

FIG. 8A

CHANGELOG

| EXEC_ID | APP_NUMBER | ENV_NUM | DB_VERSION_NO | APP_VERSION_NO | SQL_FILE_CNT | ERROR_MSG |
|---|---|---|---|---|---|---|
| Execution ID | Application number | Environment number | Database Version number | Application version number | SQL file count | Error message |

FIG. 8B

CHANGELOG_DTLS

| EXEC_ID | FILE_NAME | STATUS | EXEC_STATE | OBJECT_TYPE | EXEC_BY | ERROR_MSG | UPDATE_DATE |
|---|---|---|---|---|---|---|---|
| Execution ID | File name | Status: fail or success | Execution state | Object type: Delta or Non-Delta | Executed by who | Error message | Updated date |

FIG. 9A

| Table File Name |
|---|
| 15-ABC – 1.sql (Delta) |
| 15-BACKOUT-ABC – 1.sql (Delta) |
| 16-XYZ.sql (Non-Delta) |
| 17-XYZ.sql (Non-Delta) |

FIG. 9B

| Delta Types (One per File) | Delta Types (Multiple per File) | | | Non-Delta Types (Drop and Replace) | | |
|---|---|---|---|---|---|---|
| tables | sequences | constraints_pk | | triggers | procedures | packages |
| | indexes | constraints_other | | views | jobs | materialized_views |
| | types | constraints_fk | | | functions | materialized_view_logs |
| | anonymous block | | | | | |

TECHNIQUES FOR AUTOMATED DATABASE DEPLOYMENT

TECHNICAL FIELD

Embodiments of the present invention relate generally to database and related software management and, more specifically, to techniques for automated database deployment.

BACKGROUND

Electronic databases have become an indispensable part of modern-day life. Business organizations, government entities, and individuals rely heavily on all kinds of databases for information and/or services. To a business organization, its databases can be one of its most important assets and/or tools to support smooth operations.

As repositories of organized data, databases usually have to keep their content updated. Changes of database content are typically applied by executing one or more scripts of database programming statements such as those written in Structured Query Language (SQL). The execution of database changes in a particular computing environment is referred to as database deployment. Moving a database from one environment to the next is referred to as "promotion." A high-level illustration of a typical process of database promotions is shown in FIG. 1A.

Prior approaches to database deployment have been primarily disorganized, manual processes which are quite inefficient and error-prone. For example, with the prior methods, there is no formal process for checking and testing SQL statements before proceeding to Quality Assurance (QA). Developers are often making ad-hoc changes directly to the live database, which can muddle the database with unnecessary changes and errors. As proposed SQL changes are forwarded via an ITSM (IT service management) procedure to QA, changes are usually rejected upon discovery of the first error and sent back to the developer. Developers typically have no way of tracing the source of errors, and they receive piecemeal notification after every error occurs instead of receiving one notice of all captured errors. If the database becomes filled with errors, there is no effective process to roll it back to a previous state. FIG. 1B highlights some of the deficiencies and drawbacks of such a prior art process for database deployment.

In contrast to the relatively mature process established for source code builds and deployments, there has been no systematic methodology to enforce version control over database changes in a way where the change history can be researched. As a result, it is an extremely difficult task to take the UAT environment, for example, and figure out what SQL needs to be created to apply against the Production (PROD) database to update it to the latest version. This is in stark contrast to code deployment, where old code could be simply deleted and replaced with new code.

This is further complicated by the fact that often changes have been made to the production database either as part of completing the last deployment and/or as maintenance activities. These changes are often unknown to the development team and could cause the deployment to fail. There is currently no systematic method to determine if ad-hoc changes have been applied to a PROD environment but never documented or recorded after so-called "emergency" fixes. As a result, the database becomes essentially the "system of record" as opposed to the subject of a properly implemented version control mechanism, and there is no way to track the history of changes including who made a change or when.

With the prior database deployment approaches, gathering the correct sets of SQLs for changes to production is also difficult and prone to errors, as it may be months since the last PROD promotion, and SQL changes need to be run in groups matching the changes that were done in lower environments. Also, there is no satisfactory way to pre-validate SQL changes to PROD or UAT environment in regular business hours to help guarantee that the outage event goes smoothly as far as database changes are concerned. The common practice for database testing was to use a "golden database" that is maintained by hand to run tests against, which could be highly inefficient.

Nor is there any post-deployment testing mechanism to determine with good confidence whether failures when running updated functional test are truly test failures and not because the database is out of date or not in sync.

With all these technical problems described above, there is now a particular need for improved solutions of database deployment.

There are commercial industry solutions that attempt to solve some of the above-described issues, for example, by comparing two database versions and creating change SQL based on the differences. Some organizations have adapted their development practice to use this model. Most large organizations, however, would not be able to adapt their database development practice to this paradigm. A technical solution for database changes is needed that is more adaptable for the paradigm or practice most commonly in use at large business organizations.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIG. 7 shows an exemplary table recording the date, status, and version numbers etc. of an exemplary set of database change files in accordance with an embodiment of the invention;

FIGS. 8A-8B show two exemplary tables of records use to track deployment history in accordance with embodiments of the invention;

FIG. 9A shows an exemplary set of SQL files of different object types and having different prefixes and/or suffixes in accordance with an embodiment of the invention; and FIG. 9B shows a list of Delta and non-Delta object types according to one embodiment of the present invention.

SUMMARY OF THE INVENTION

Figure 1A:
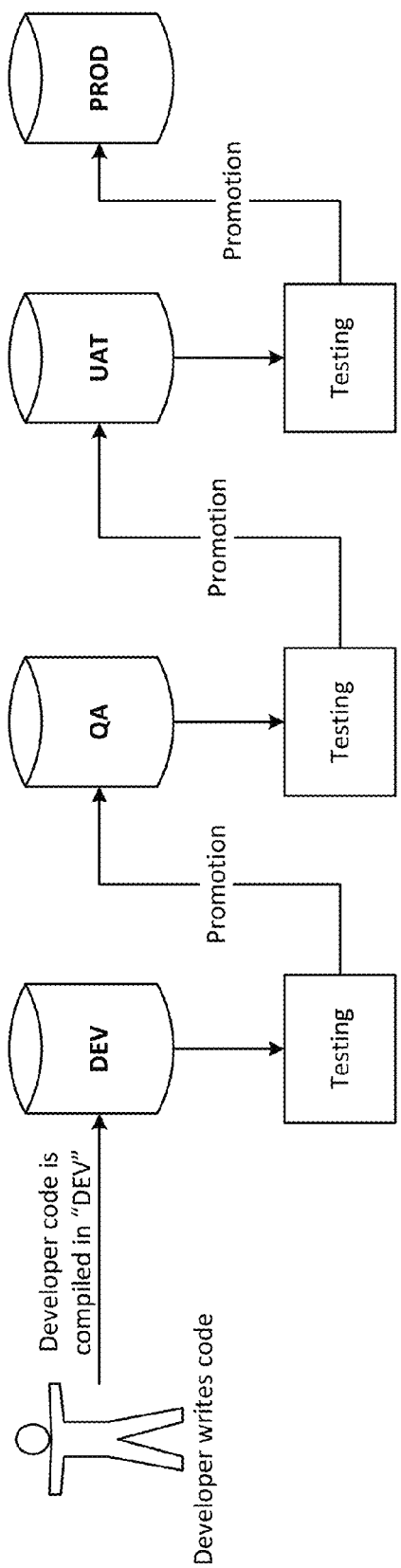
FIG. 1A is a block diagram illustrating a prior art process for code promotion between environments.
Figure 1B:
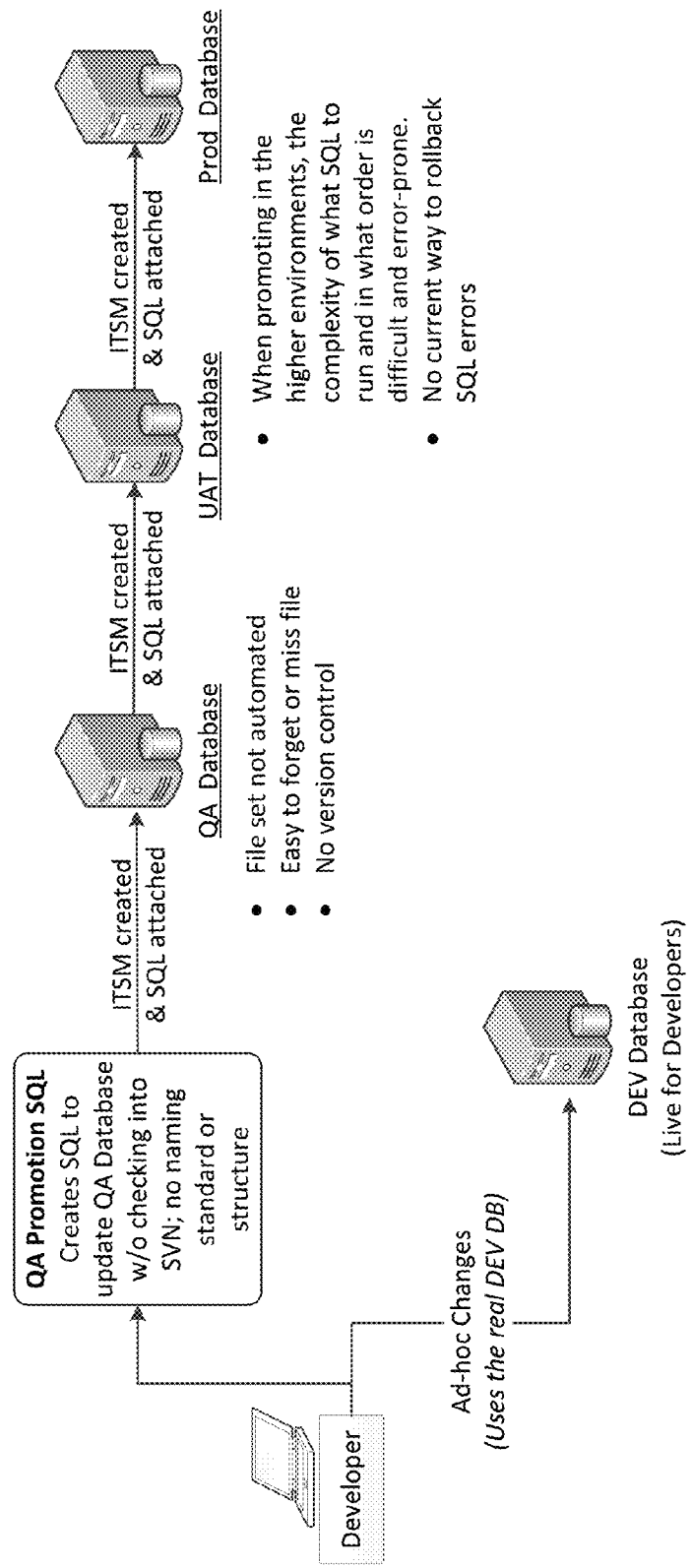
FIG. 1B is a block diagram highlighting deficiencies in a prior art process of database deployment.

Disclosed herein are systems and methods for automated database deployment.

According to one particular embodiment of the present invention, a computer-implemented method for automated database deployment may comprise automatically performing the steps of: retrieving, from a first designated repository location, proposed change files for a target database; coordinating the proposed change files into an execution sequence; validating the proposed change files by executing the proposed change files, against a copy of said target database, according to the execution sequence; and generating a master execution file by sequencing individual validated change files, wherein the master execution file, when executed, applies validated changes to said target database.

According to another particular embodiment of the present invention, a computer-implemented system for automated database deployment may comprise at least one storage device having a first designated repository location and at least one computer or server communicatively coupled to said at least one storage device. And, the at least one computer or server can be configured to execute one or more codes for: retrieving, from said first designated repository location, proposed change files for a target database; coordinating the proposed change files into an execution sequence; validating the proposed change files by executing the proposed change files, against a copy of said target database, according to the execution sequence; and generating a master execution file by sequencing individual validated change files, wherein the master execution file, when executed, applies validated changes to said target database.

According to yet another embodiment, a non-transitory computer readable medium for automated database deployment may have code for causing a computer or server to automatically perform the steps of: retrieving, from a first designated repository location, proposed change files for a target database; coordinating the proposed change files into an execution sequence; validating the proposed change files by executing the proposed change files, against a copy of said target database, according to the execution sequence; and generating a master execution file by sequencing individual validated change files, wherein the master execution file, when executed, applies validated changes to said target database.

With embodiments of the present invention, change SQL files intended for any target database are checked into a designated source code control repository. A pre-validation process is applied to the proposed changes and reports all errors therein, not just the first error found. A meticulous monitoring and logging mechanism may find and report changes that have been done against a database since the last deployment, including changes applied without following source code control procedure. All recent SQL files since previous promotion can be automatically gathered, sequenced and built into a master run book SQL for execution in a correct sequence. Backout SQL may also be automatically generated and validated. A pre-test or mock deployment may be performed during regular business hours against an automatically generated copy of the target database. By keeping database deployment and application deployment in synchronization, and/or by keeping database environments in synchronization, the deployments and maintenance of databases become much more efficient, and failure rates and failover responses could be significantly improved.

Furthermore, embodiments of the present invention may ensure the SQL in source control matches what is in the corresponding target database and reliable audit and history information is available. With both code and database deployed in an automated (or hands-off) fashion, and with a success or fail indicator, functional tests can be run post-deployment to identify true test failures versus those resulting from the database being out of date or out of sync.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

DETAILED DESCRIPTION

Embodiments of the present invention solve various problems and drawbacks associated with prior approaches of database deployment. The present invention introduces a new paradigm of source control, full automation, and change tracking to the realm of database promotions or deployments. The present invention creates a repeatable process for SQL changes checked into source control, automates the migration of a target application database from the current version to the next, and reliably promotes the changes through different environments.

Figure 2:
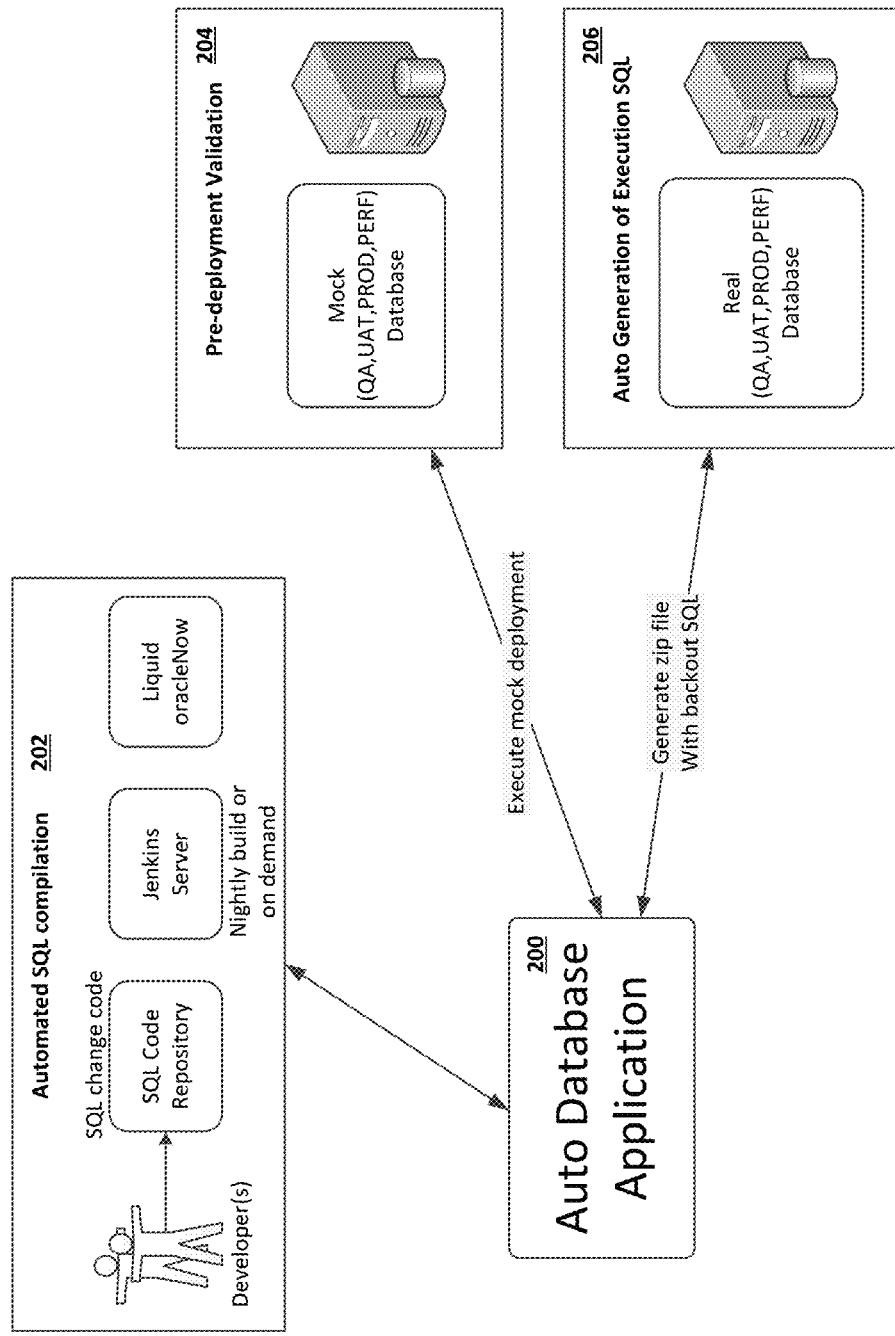
FIG. 2 is a block diagram providing an overview of exemplary database deployment techniques in accordance with embodiments of the invention.

FIG. 2 shows an overview of the inventive concepts behind embodiments of the present invention. A software application (or a suite of software modules) 200, referred to herein as "Auto Database" or "AutoD," may be executed to implement functions of automated SQL compilation (202), pre-deployment validation (204), and/or automated generation of execution SQL (206), which collectively support the new paradigm of automated database deployment as described in more detail below.

According to some embodiments of the present invention, the AutoD application may be implemented as a daemon or "always running" program that runs on the same server that a target database (or its copy) resides. According to one embodiment, the AutoD application may have two components or executables, a main program and a server process that runs on the pre-QA Oracle server and listens for REST commands and then executes DBA level functions. For example, it listens on a port for REST commands, and executes DBA (database administration) type commands on requests such as "Flashback to restore point," create new user/schema, and delete user/schema. The Jenkins server may be configured or operated to call the AutoD application, for example, either on a scheduled basis (nightly) or on demand with selected arguments.

Automated SQL Compilation

An important aspect of the present invention is to require all database changes to be checked into a source code control repository, a designated storage location for proposed database changes, for example SVN/Git, and to use this as the initiation point for automating the database deployment.

Figure 3:
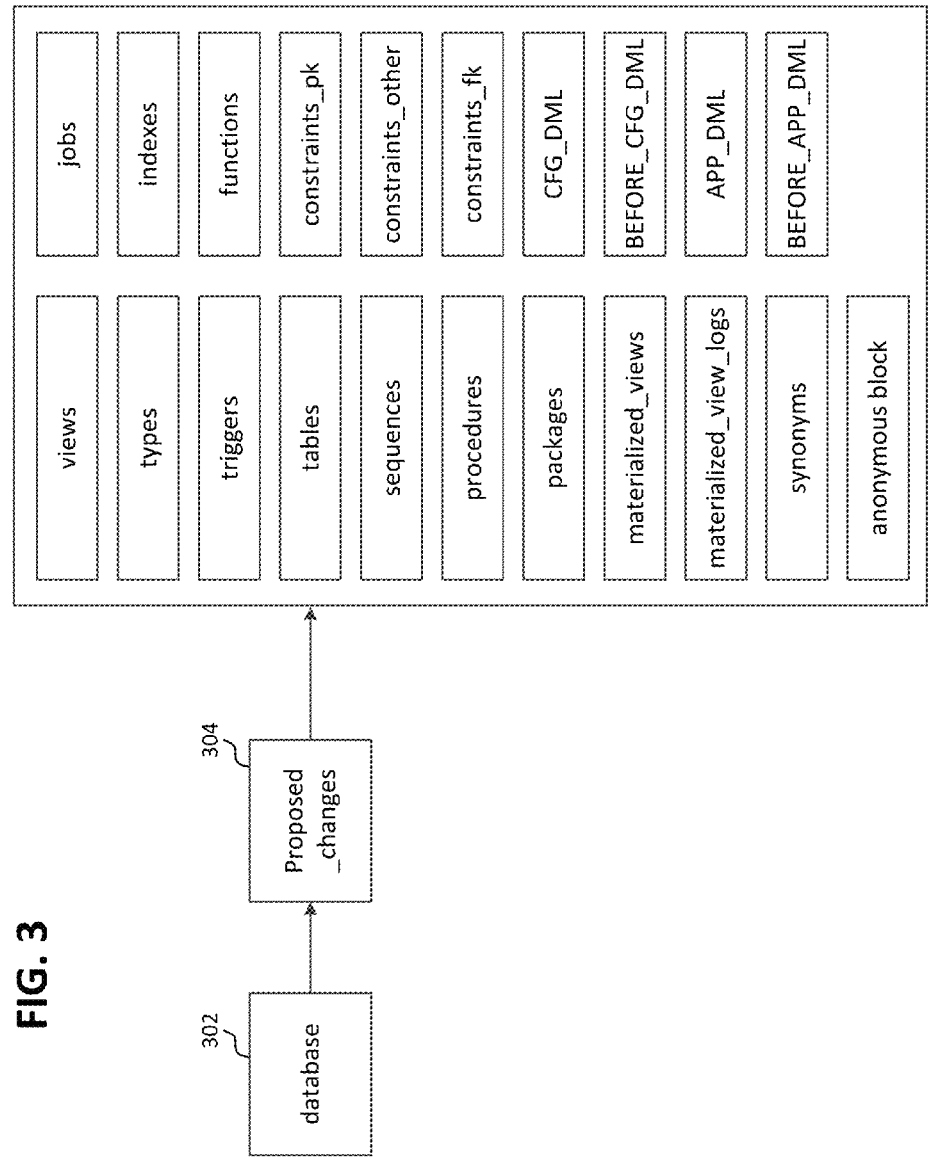
FIG. 3 is a block diagram illustrating an exemplary process for checking in proposed database changes in accordance with an embodiment of the invention.

When the AutoD application 200 is run the first time, it may create a directory structure in the source code control repository for storage of proposed database changes. FIG. 3 shows one example of such directory structure according to one embodiment of the present invention. The "database" folder 302 represents the chosen location or position in the end user's repository for AutoD files. The "proposed_changes" folder 304 is the key user interface location where the user places his or her change SQL as initial proposed changes against the QA database. If all the change SQLs are validated, they are moved into the "validated_changes" folder and the version number of the database is incremented.

Figure 4A:
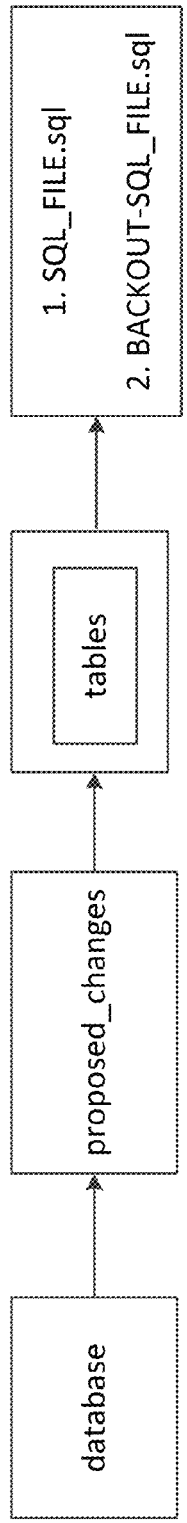
FIGS. 4A-4B are block diagrams illustrating exemplary processes for checking in proposed database changes in accordance with embodiments of the invention.

A developer who wishes to apply changes to a target database has to check in SQL code by placing .sql files into an object type folder under "proposed_changes." FIG. 4A shows one example with the Tables folder. What the developer checks in may include both a (positive) SQL file for applying desired changes to the target database ("SQL_FILE.sql") and another SQL file ("BACKOUT-SQL_FILE.sql") which essentially does the opposite of the positive SQL file, as will be described in more detail below.

In the automated SQL compilation (202) procedure, as a new change SQL is checked into the source control repository, the AutoD application may be executed to run that SQL against a copy of QA database and perform a "test run" of the proposed changes. This can be part of a Continuous Integration or nightly build.

Figure 5:
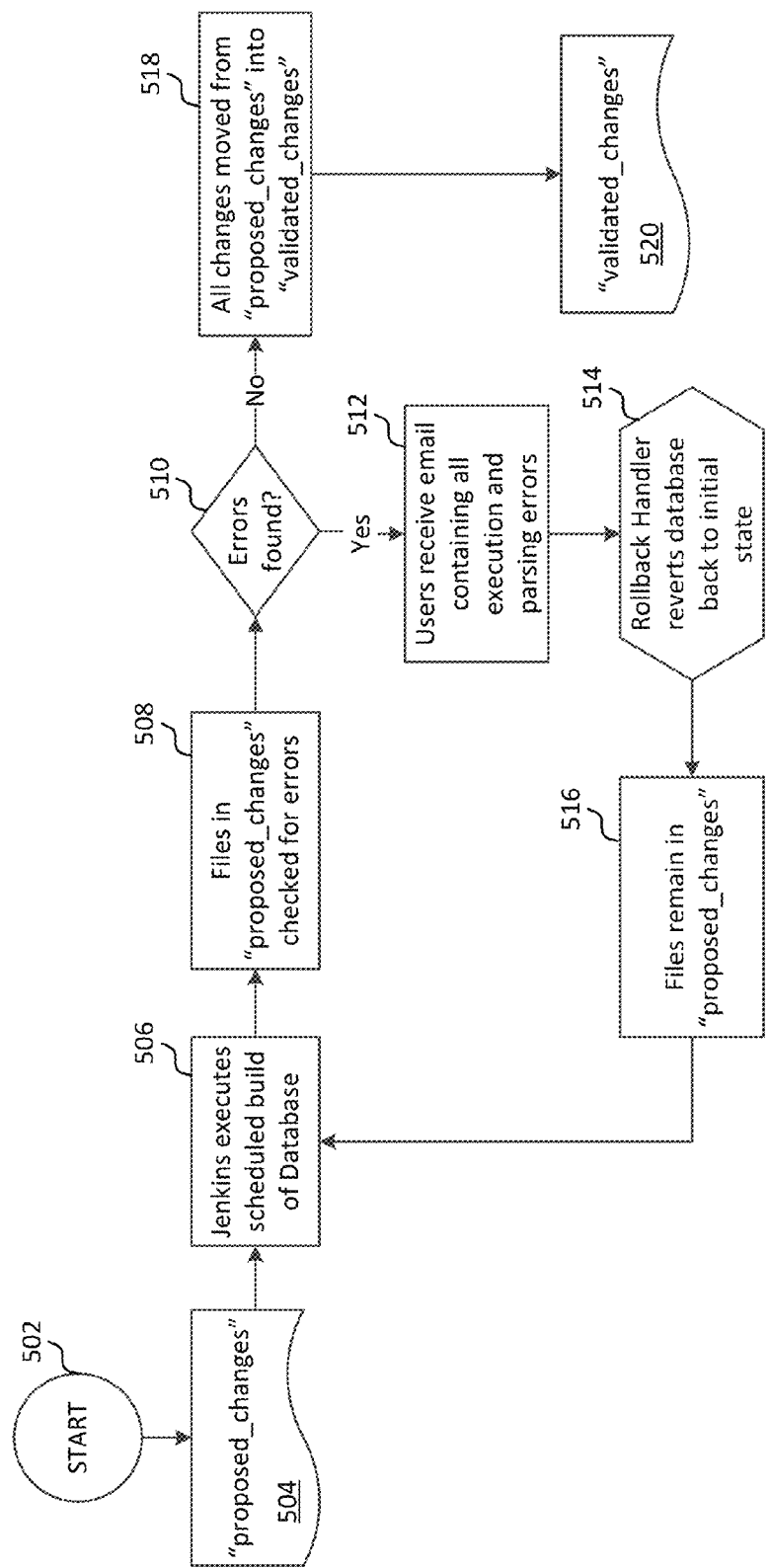
FIG. 5 is a flow diagram illustrating an exemplary process for automated SQL pre-validation and compilation in accordance with an embodiment of the invention.

FIG. 5 shows a flow chart illustrating an exemplary process for validating and/or testing proposed database change files according to one embodiment of the present invention.

The process starts in Step 502 and locates all the currently proposed database changes in a designated source code control repository (504). The proposed changes may come from one or more large development teams spread across different geographic areas and time zones. According to embodiments of the present invention, a policy may be enforced to require that only proposed changes properly checked into one or more designated source control repositories will be eligible for deployment to target database(s).

In Step 506, for example, on a nightly basis, a continuous integration server (e.g., a Jenkins CI server) may execute a scheduled build of a target database.

In Step 508, files in the "proposed_changes" folder at the designated storage location may be checked for errors. According to some embodiments of the present invention, all eligible proposed changes may be automatically pulled from the source control, re-sequenced into a proper order, and then pre-validated against a progressive version of a copy of the QA database (referred to as Pre-QA database). This Pre-QA or DEV validation occurs before any change SQL is actually used.

The re-sequencing may be desirable because the proposed changes could come from different developers or development teams who may not have coordinated their proposed changes to be applied to the same target database. According to some embodiments, an automatic re-sequencing may be performed based on the object types and known ordering logic as to what SQL must be run first. According to other embodiments, user specified re-sequencing may be accommodated, where the user specifies a sequence number as part of a file. For example, on Day 1, developer Bob may check in SQL_FILE_3.sql; on Day 2, developer Sally may check in SQL_FILE_1.sql; and on Day 3, developer John may check in SQL_FILE_2.sql. The AutoD program may run the files SQL_FILE_1.sql, SQL_FILE_2.sql, and SQL_FILE_3.sql in the ascending order.

The pre-validation of the proposed database changes may be based on parsing of the change SQL file(s) and/or execution of the change SQL in the Pre-QA environment.

In Step 510, it is determined whether errors are found in the proposed database changes. If so, a report and/or notification email listing any execution errors and/or parsing errors may be automatically generated (in Step 512) for a developer associated with the failed change SQL.

When testing against the QA database, it is preferable that all proposed change SQL be run, such that, if there are errors, all of them will be part of the feedback to developers, saving potential delays of multiple ITSM's (days) to get the initial QA promotion SQL correct.

Previously, if a developer wants his SQL files to be executed, he would have to attach his SQL files to an ITSM for a DBA to execute. If an error is found on the first file, the DBA will stop and send the files back to be fixed. Once the file is fixed, the developer will have to open another ITSM (which can take several days) for the DBA to execute the revised SQL files again. If another error is found, the DBA would once again send it back to be fixed. This can go on for a very long time.

Here, with the AutoD Database Application, all change files can be ran regardless of errors. Then, at the end of execution, a list of all errors may be generated and given to the developer. As a result, the AutoD database process according to the present application could provide comprehensive feedback in just a few minutes in comparison to what used to take days. In addition, the feedback may also include cross-impact between change SQL files proposed by different developers or teams.

In Step 514, a Rollback Handler may revert the Pre-QA database back to an initial state prior to the occurrence of the one or more execution errors. For example, upon detecting one or more errors during the automated pre-validation test, the Pre-QA database may be automatically rolled back using the Oracle "FLASHBACK" technology.

FLASHBACK is an Oracle database feature which restores an entire Oracle database to a previously set "restore point" without having to use a full export and import as normally is the process. Such full database restoration capability is important to the standalone, hands-off, or fully automated nightly builds.

Typically, a restore point is set up at the beginning of a nightly deployment. The AutoD application running on the database server instance listens for the "FLASHBACK" request. This request requires the database to be dismounted and then remounted "exclusive" to execute the "FLASHBACK" function. FLASHBACK is automatically executed (by the AutoD application) when there is any failure during the automated nightly build. It restores the database back to the pre-set restore point, so that the files in the "proposed_changes" folder can be run again, repeatedly until all files have been tested or validated.

Those change files that have parsing and/or execution errors will remain in the "proposed_changes" location (516). Once they have been revised, the change files could be checked into the designated source control again and become part of the next scheduled build.

In Step 518, the SQL in the proposed changes that runs without issue is now pre-validated and can be moved to a second designated storage location, "validated_changes" (520).

According to some embodiments, when the SQL files in the proposed_changes folder are executed successfully and moved to the validated_changes folder, the validated files may be assigned a version number, for example, DEV_version_1. Subsequently, if newer SQL files are checked into proposed_changes folder again and are executed successfully, those newer SQL files will also be moved to the validated_changes folder and may be packaged as DEV_version_2. FIG. 7 shows an exemplary table recording the date, status, and version numbers etc. of an exemplary set of database change files.

Over the years, a very mature process has been established for code builds and deployments, but a similar process did not exist for database deployment. For the first time now, database deployments based on the methodology described herein can be part of the DevOps continuous integration process. The system may automatically manage keeping the database code "in sync" with the application code by enforcing the following mechanisms of database deployment: (1) the system requires that the only way to effectuate database deployment is via change SQL that is checked into a designated source code repository; (2) the system detects and reports any changes made to the database(s) in each of the environments that were done outside of mechanism #1, in order to guarantee that what is in the source code control repository and was deployed by the application truly matches the state of the database(s); and (3) the system further enforces a "one common version across all environments" philosophy as changes are promoted from lower environments to higher environments, guaranteeing that all databases or environments are "in sync."

The system may therefore automatically trace all versions of a database in each environment. The system can identify the "good" database version and mark the promotion SQL sets that were used to move a database from one version to the next.

Pre-Deployment Validation

When ready to run the validated changes to the QA environment, all the SQL since the last QA promotion may be automatically gathered and organized and a master SQL (or run book) may be automatically generated to ensure the SQL is organized into correct groupings and order of execution required for a successful promotion event. This master SQL or run book may be referred to as "Go-Forward SQL."

During database deployment things may go wrong, resulting in a decision being made to "go back" and cancel the deployment. This requires "Backout SQL" which is designed to undo whatever was done by running the Go-Forward SQL. It is good practice to create Backout SQL because restoring a database is a time-consuming and costly endeavor. Having the Backout SQL handy just in case the Go-Forward SQL fails can dramatically reduce the time and customer impact should it become necessary to roll back the deployment.

To allow for a test run, a temporary database may be created and the target database is copied into it. Then, the full deployment may be validated by executing the Go-Forward SQL against this temporary "test" database. The creation of the temporary "test" database and the testing can be fully automated, with no human having to enter special commands.

As part of the pre-deployment validation procedure, a fully automated validation of Backout SQL is also preferably performed. It validates that Backout SQL actually works as it should, taking the database back to the starting point.

Backout SQL is a mixture of developer written and system generated, but does not traditionally have a high rate of success as it is rarely tested. However, there is currently no systematic way to enforce that Backout SQL is always tested and production issues have arisen as a result. The pre-validation process according to the present invention may ensure that Backout SQL is built, tested and proven prior to implementation.

According to embodiments of the present invention, Backout SQL may be validated by running the Go-Forward SQL and then the Backout SQL. After this is done, the program can compare the before and after states of the database schema, which should be identical if the Backout SQL is executed correctly.

For example, a Go-Forward SQL is to create a table in a target database; the Backout SQL is supposed to drop that table from the database. There is a first schema before the Go-Forward SQL is executed to create the database table. When the Backout SQL is executed, it results in a second schema. When the first schema is compared to the second schema, they should be the same which means the table that was created with the Go-Forward SQL should no longer be there. If the table is still there after running the Backout SQL, it means that the Backout SQL has failed.

After the change SQL is executed, it is common that changes are made to the target environment without being included in subsequent builds. These are changes made to a database (usually PROD) which are applied manually and undocumented or unrecorded, typically as part of completing a deployment when issues come up or between deployments as part of maintenance. According to embodiments of the present invention, the AutoD program may detect when such out-of-band or unexpected changes occur and record a manual decision: if the deployment is allowed to proceed and on whose authority. In addition to the detection of "unexpected changes," the system may also record and keep track of these changes which typically would become "lost." When such changes have been made to the database, the AutoD program may notify authorized users and the developer running the program is given the option to either override the changes and continue with deployment or go back and update the database to the appropriate version. If the developer chose to override, the decision may be recorded and an email may be automatically sent to all parties involved.

Each time a promotion is done to any of the "higher" environments (e.g., UAT, PERF, or PROD), a fully automated extract of the current database schema may be pulled and compared against the previous one (recorded in SVN/Git), so that any out-of-band or ad-hoc changes can be detected and properly recorded.

For the higher environments the extracted schema can be loaded into a "MOCK" database and the change SQL can be run against the MOCK database during business hours so that any issues can be found and fixed before the actual outage event. Thus, for each environment (e.g., QA, UAT, PROD), this MOCK execution procedure pulls a copy of the target schema and validates it just in case there is something different about the actual target database.

Additionally, the system may perform the task of bringing all environments back into "sync": if they are not in synchronization, it may determine who authorized them to be left out of sync. The different environments are "in sync" when the same set of changes are deployed to each of the environments. Leaving environments out of sync is one of the biggest data production issues during database deployment. To bring an environment in sync, the latest version of the previous environment is deployed to that environment. For example, if QA is QA_version_3, and UAT is UAT_version_2, then QA_version_3 code should be deployed to UAT.

Automated Generation of Execution SQL

According to embodiments of the present invention, since the system tracks the history of deployments to a particular environment, it knows what promotion SQL needs to be run against that environment in order to "update" the corresponding database to a newer, correct version. As a result, the system also knows how to create a master "run" SQL to execute those promotion SQL files in the correct order. This relieves the task of having to write out instructional steps in a manual, error-prone process. This generation of master "run" SQL may be automated for different deployment situations and scenarios. For example, full automation can still apply even if the user decides to "skip" an environment temporarily due to overloaded resources.

The system may keep track of the deployment history in a number of ways. According to one embodiment, related tables of records may be maintained by the system to track deployment history. Two examples of such tables are shown in FIGS. 8A and 8B. The table ("CHANGELOG") shown in FIG. 8A lists, in association with each EXEC_ID, the information of the software application that is executed, the database and environment in which the execution occurs, the SQL file count, and any error message. The table ("CHANGELOG_DTLS") shown in FIG. 8B lists, in association with each EXEC_ID, such information as file name, state of the execution (fail or success), object type (Delta versus Non-Delta), and who executed the file, etc.

There may be two object types of database changes, Delta type and Non-Delta type. A Non-Delta type, also known as "Drop and Replace," is a database object type that can safely be deleted (or dropped) and replaced with a new one, such as a function, or stored procedure. A Delta type is one that cannot be simply dropped and replaced, such as a Table, but must evolve with a series of delta changes being applied. For example, it is impractical to do anything else with tables because of the data and the foreign key relationships.

Figure 6:
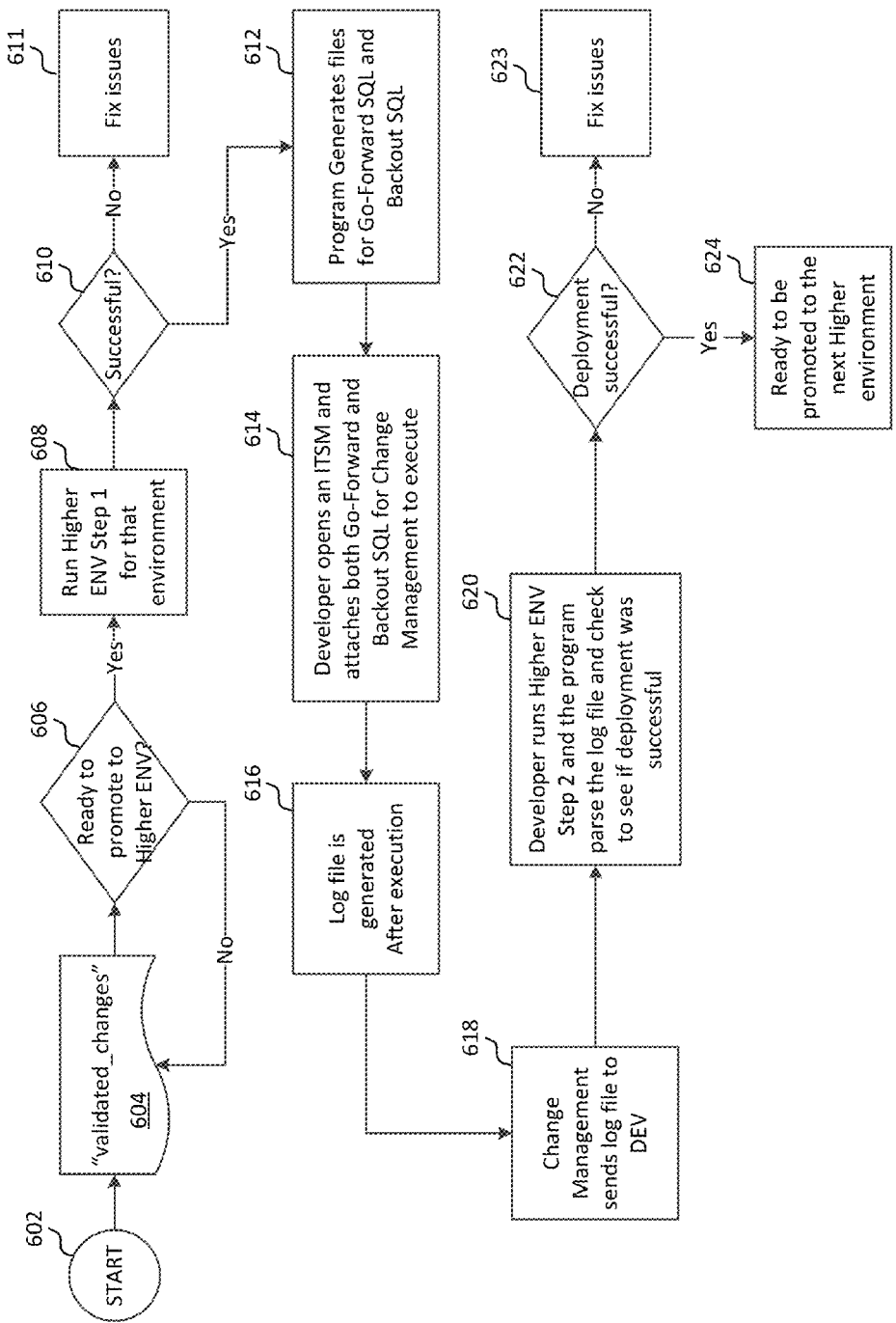
FIG. 6 is a flow diagram illustrating an exemplary process for promoting a set of validated changes to a higher database environment in accordance with an embodiment of the invention.

FIG. 6 shows a flow chart illustrating an exemplary process for promoting validated database changes to a higher environment.

The process starts in Step 602. The database change SQL files that have been pre-validated may be stored in the validated_changes location (604) such as a file folder.

In Step 606, it may be determined whether those change SQL files are ready to be promoted to the next higher environment, for example, from QA to UAT or from UAT to PROD. If the files are not ready, they will remain in the validated_changes location (604).

If the files are ready for promotion, then in Step 608, a "Higher Environment Step 1" program module may be executed to kick off the process of promoting to a higher environment. For Higher Environment Step 1, certain arguments are passed to the AutoD program. As part of the AutoD program, Higher Environment Step 1 is configured to carry out the process of getting the files ready and organized for execution; a subsequent Higher Environment Step 2 module performs the execution, reading, and recording of the execution results.

In Step 610, it is determined whether the AutoD program has run successfully. If the program fails to run successfully, the process branches to Step 611 where the issues or errors may be fixed. If the program runs successfully, then in Step 612 the program generates files for the Go-Forward SQL and Backout SQL. For example, a zip file for the Go Forward SQL and a zip file for the Backout SQL may be created and both of these zip files may contain a Master SQL. According to one implementation, the AutoD program may be designed to generate a ZIP file to be handed off to be manually executed. According to another implementation, the AutoD program may be configured so that both the generation and execution of the Master SQL are completed by the program in a way transparent to the end user.

As mentioned above, to generate the Go-Forward SQL, the individual SQL files are automatically pulled and sequenced. The mechanics of this automated process may be illustrated with the following example. When a change file is moved to the "validated_changes" folder as described above, the file may be given a prefix and/or suffix. For example, every file may be prefixed with a number reflecting is the version of the target database. However, only Delta types may have a suffix. Since there are many different actions that can be performed for a Delta type file, the order of execution matters. For instance, if SQL_FILE_2.sql is to drop a table and SQL_FILE_1.sql is to create the table. If SQL_FILE_2.sql is executed first, it will result in an error because a table cannot be dropped before it is created. FIG. 9A shows an exemplary set of SQL files of different object types and having prefixes and/or suffixes based on the object type. FIG. 9B shows a list of Delta and non-Delta object types according to one embodiment of the present invention.

The Backout SQL is generated by either the user(s) or the system depending on the related object types. For Delta object types such as tables, the user is required to provide the Backout SQL. For non-Delta object types such as triggers, the system may automatically generate the Backout SQL. The users have to provide their own Backout SQL for Delta types because Delta types can be altered or operated on in many ways, whereas non-Delta types are just dropped and replaced.

Figure 4B:
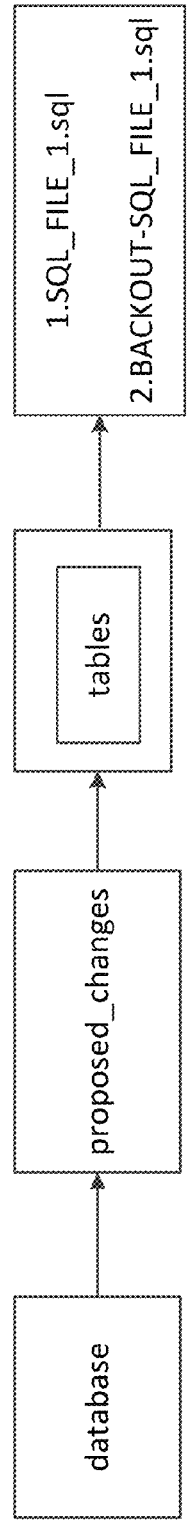

For the Delta types, the Backout SQL is checked in the same way as all the other SQL files. For non-Delta (i.e., drop-and-replace types), the system may create automatically the Backout files using the previous versions from the source code control system (if no previous version exists, a drop statement is automatically generated). FIG. 4B shows an example of a user checked in delta type change.

Next, in Step 614, the developer may open an ITSM ticket and attach both Go-Forward SQL and Backout SQL for Change Management to execute.

In Step 616, a log file may be generated after execution of the Go-Forward SQL. According to some embodiments, the log file may be generated whenever a promotion (Go-Forward) SQL is executed as well as when Backout SQL is executed.

According to embodiments of the present invention, a unique log file of each execution may be automatically generated and retained for validation purposes. A signature (e.g., a unique number correlated to an ITSM ticket that is associated with the execution of SQL files) may be generated as part of the log file to ensure the correct log file is recorded and utilized as the final record. Since the master run file is generated by the system, the associated log file format is under control of the system. The log file may be read for final validation that the SQL was executed on a certain date and time and that there were no errors.

In Step 618, Change Management may send the log file to DEV server.

In Step 620, the developer may run Higher Environment Step 2 and the AutoD program may parse the log file to determine whether deployment has been successful (Step 622). If the deployment is not successful, then the issues or errors may be fixed in Step 623. If the deployment is successful, then the changes are ready to be promoted to the next higher environment in Step 624. As part of the AutoD program, Higher Environment Step 2 module is configured to carry out the execution, reading, and recording of the execution results.

For continuous integration or nightly builds, post-deploy Business Validation tests can be run since the database changes are now "in sync" with the application code.

Since the system enforces all changes to be in SVN/Git, developers can now trust that "what is in SVN matches what is on the systems" like they can for application code. This allows for research on the changes, including which person made each change, so that in outage events the knowledgeable person can be quickly identified.

Although the description of embodiments of the present invention so far has been using SQL language and Oracle database in the various examples, those skilled in the art can appreciate that the automated database deployment methodologies disclosed herein are not limited to the particular language or database type. For example, other database types such as IBM, Tandem, or Sybase may also benefit from the techniques disclosed herein.

It can also be appreciated that these database deployment techniques may be adapted for database promotions between different environments and are not necessarily limited to QA or UAT environments.

Computer Implementation

Those skilled in the art will appreciate that the present invention is targeted at technical problems arising in the context of computing environments and the inventive solutions are particular to the management of electronic databases. The components used to implement embodiments of the present invention may be or include a computer or multiple computers. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that embodiments of the present invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/non-volatile computer storage media. For example, a hard disk drive may read or write to non-removable, non-volatile magnetic media. A magnetic disk drive may read from or writes to a removable, non-volatile magnetic disk, and an optical disk drive may read from or write to a removable, non-volatile optical disk such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown or described here, those of ordinary skill in the art will appreciate that such components and the interconnections are well known. Accordingly, additional details concerning the internal construction of the computer need not be disclosed in connection with the present invention.

In operation, a computer processor or the like in a computer or server system may be configured with a special set of program instructions to automatically perform security filtering functions consistent with the methodology described above.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this application.

The invention claimed is:

1. A computer-implemented method for automated database deployment, the method comprising automatically performing the steps of:
    retrieving, from a first designated repository location, one or more proposed change files for a target database, the proposed change files specifying one or more changes to be applied to data content of the target database;
    coordinating the proposed change files into an execution sequence;
    validating the proposed change files by executing the proposed change files, against a copy of said target database, according to the execution sequence; and
    generating a master execution file by sequencing individual validated change files, wherein the master execution file, when executed, applies validated changes to the data content of said target database.

2. The computer-implemented method of claim 1, further comprising:
    validating the generated master execution file.

3. The computer-implemented method of claim 1, further comprising:
    automatically generating a backout execution file that, if executed against said target database, will undo the changes applied to said target database by the master execution file.

4. The computer-implemented method of claim 3, further comprising:
    validating the generated backout execution file to confirm its execution will undo the changes applied to said target database by the master execution file.

5. The computer-implemented method of claim 1, further comprising:
    generating a report of execution errors of a proposed change file.

6. The computer-implemented method of claim 1, further comprising:
    generating a report of parsing errors of a proposed change file.

7. The computer-implemented method of claim 1, further comprising:
   generating a report of any cross-impact among the proposed change files.

8. The computer-implemented method of claim 1, further comprising:
   automatically creating the copy of said target database for validation of the proposed change files.

9. The computer-implemented method of claim 1, wherein, after each execution error, the copy of said target database is restored to a previous state before said execution error.

10. The computer-implemented method according to claim 1, further comprising:
   moving the proposed change files that pass the validation to a second designated repository location; and
   leaving the proposed change files that fail the validation in the first designated location and generating a notice to a developer associated with the failed files.

11. The computer-implemented method according to claim 10, further comprising:
   automatically retrieving the individual validated change files from the second designated repository location.

12. The computer-implemented method of claim 1, further comprising:
   automatically validating each proposed change file upon checking said each proposed change file into the first designated repository location.

13. The computer-implemented method of claim 1, wherein the proposed change files are automatically collected and validated in batch on a nightly basis or other periodic basis.

14. The computer-implemented method of claim 1, wherein the proposed change files are in a format of Structured Query Language (SQL).

15. The computer-implemented method of claim 1, wherein said target database is in an environment selected from a group consisting of: a development (DEV) environment, a quality assurance (QA) environment, a user acceptance testing (UAT) environment, a production (PROD) environment, and a performance testing (PERF) environment.

16. A computer-implemented system for automated database deployment, the system comprising:
   at least one storage device having a first designated repository location;
   at least one computer or server communicatively coupled to said at least one storage device and configured to execute one or more codes for:
      retrieving, from said first designated repository location, one or more proposed change files for a target database, the proposed change files specifying one or more changes to be applied to data content of the target database;
      coordinating the proposed change files into an execution sequence;
      validating the proposed change files by executing the proposed change files, against a copy of said target database, according to the execution sequence; and
      generating a master execution file by sequencing individual validated change files, wherein the master execution file, when executed, applies validated changes to the data content of said target database.

17. A non-transitory computer readable medium for automated database deployment, the non-transitory computer readable medium having code for causing a computer or server to automatically perform the steps of:
   retrieving, from a first designated repository location, one or more proposed change files for a target database, the proposed change files specifying one or more changes to be applied to data content of the target database;
   coordinating the proposed change files into an execution sequence;
   validating the proposed change files by executing the proposed change files, against a copy of said target database, according to the execution sequence; and
   generating a master execution file by sequencing individual validated change files, wherein the master execution file, when executed, applies validated changes to the data content of said target database.

* * * * *